May 1, 1928.

H. R. GIBBONS

CAGE FOR ANTIFRICTION BEARINGS

Filed June 4, 1927

1,668,112

INVENTOR
HAROLD R. GIBBONS

Gales P. Moore

HIS ATTORNEY

Patented May 1, 1928.

1,668,112

UNITED STATES PATENT OFFICE.

HAROLD R. GIBBONS, OF CHATHAM, NEW JERSEY, ASSIGNOR TO GENERAL MOTORS CORPORATION, OF DETROIT, MICHIGAN, A CORPORATION OF DELAWARE.

CAGE FOR ANTIFRICTION BEARINGS.

Application filed June 4, 1927. Serial No. 196,507.

This invention relates to cages for antifriction bearings and comprises all the features of novelty herein disclosed. An object of the invention is to provide an improved, one-piece cage in which rolling elements can be readily assembled and held against loss in handling, yet capable of efficiently guiding the rolling elements on their raceways with little friction.

To these ends and also to improve generally upon devices of the character indicated the invention consists in the various matters hereinafter described and claimed.

The invention, in its broader aspects, is not necessarily limited to the specific forms selected for illustrative purposes in the accompanying drawings in which Figure 1 is an end view, partly in section, of a cage and bearing.

Figure 1:
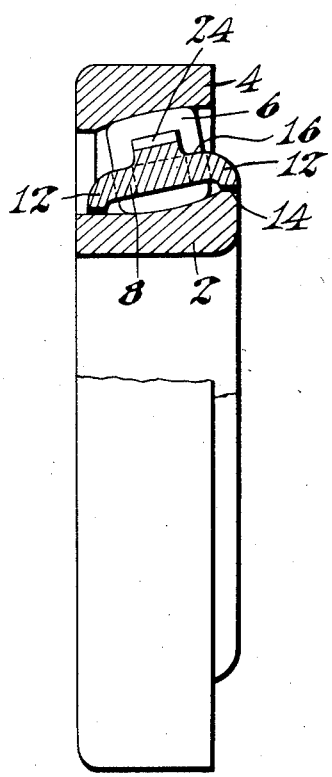
Figure 6:
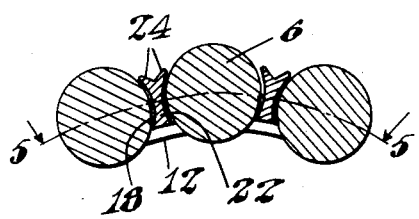
Figure 6 is a central section of a portion of the cage and rollers of Figure 1.

In Figure 1, the numerals 2 and 4, respectively, indicate inner and outer race rings for a circular series of rolling elements 6. In this instance, the race rings have transversely curved raceways which conform to barrel shaped rollers set at an angle. The cage comprises a ring shaped body portion 8 of substantially U-shaped cross section cast in one-piece with guiding openings 10 for the rollers. The sides of the ring, beyond the ends of the openings, comprise curved flanges 12 extended towards the race ring 2, the edges 14 of the flanges fitting and riding freely on the edges of the race ring outside the raceway. This keeps the cage concentric with the ring and relieves the rollers of the weight of the cage. The outermost face 16 of the body portion 8 lies in a circle through the axes of the rollers, this circle being indicated by the section line 5—5 in Figure 6, so that the cage, including its side flanges 12, lies in an annular space between this circle and the race ring 2. This enables the rollers to be inserted in the openings in a radial direction toward the cage supporting race ring.

The rollers are guided near their ends by the curved edges 18 of the openings which conform to the rollers, the continuity of the edges being interrupted as at 20 leaving portions 22 which are out of contact with the rollers. This construction reduces the surface of sliding contact and lets the rollers turn more freely. The portions 22 are extended outwardly, in the form of V-shaped lugs, to the opposite side of the circle through the axes of the rollers. After the rollers are inserted by radial movement, the lugs are expanded or divided to form retaining lips or fingers 24 which are normally out of contact with the rollers but which will partly surround and retain the rollers against escape from the guiding openings when the cage is handled separately from the race ring. Bronze is a suitable material for the cage which is particularly intended for use with large size bearings.

Figure 2:
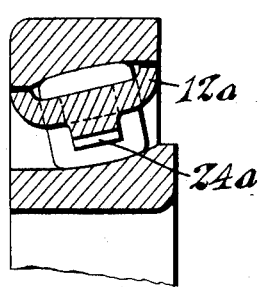
Figures 2, 3 and 4 are sections of bearings and cages of modified forms.

In Figure 2, the construction is similar but the side flanges 12ª ride on the edges of the outer race ring and the lips or fingers 24ª project inwardly. In this instance, the rollers are inserted in the cage by outward radial movement.

Figure 3:
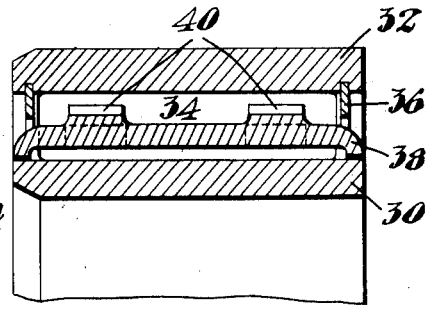

In Figure 3, the inner race ring 30 and the outer race ring 32 have cylindrical raceways for long cylindrical rollers 34 which are held from endwise movement by end rings 36. The cage, in this instance, has side flanges 38 fitting the inner race ring 30 and there are two sets of lips or fingers 40, similar to the lips 24 of Figure 1, for retaining the rollers in their openings.

Figure 4:
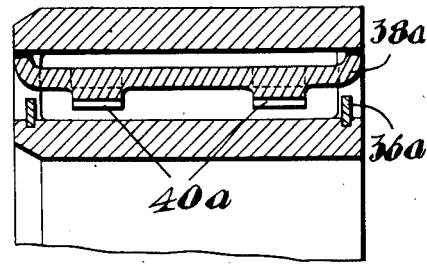
Figure 5:
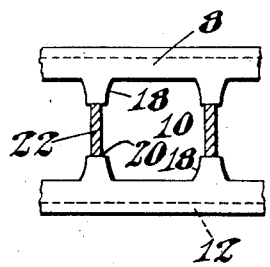
Figure 5 is a section of a portion of the cage of Figure 1 on the curved line 5—5 of Figure 6, the rollers being omitted.

In Figure 4, the construction is similar to Figure 3 but the end rings 36ª are placed on the inner race ring and the flanges 38ª of the cage are supported by the outer race ring. This form also has two sets of lips or fingers 40ª t retain the rollers.

I claim:

A self contained one-piece cage for rotatably retaining a circular series of rolling elements to be run on a race ring, said cage comprising a ring shaped body portion of substantially U-shaped cross section with guiding openings provided therein for the rolling elements, the sides of the ring beyond the ends of the openings comprising curved flanges extended towards the race ring to fit and run freely thereon, the ring with its flanges lying in an annular space between said supporting race ring and the circle through the axes of the rolling elements, whereby the rolling elements may be inserted in the guiding openings in a radial direction towards the cage-supporting race ring, the edges of the openings guiding the rolling elements, and lugs extending from the ring to points at the opposite side of the circle through the axes of the rolling elements, said lugs being expansible to retain the rolling elements in the openings but normally lying out of contact therewith; substantially as described.

In testimony whereof I hereunto affix my signature.

HAROLD R. GIBBONS.